Inventors
Ernest C. Carlson
Edward J. Johnston
Ellar A. Henningsen
Paul O. Pippel
Attorney

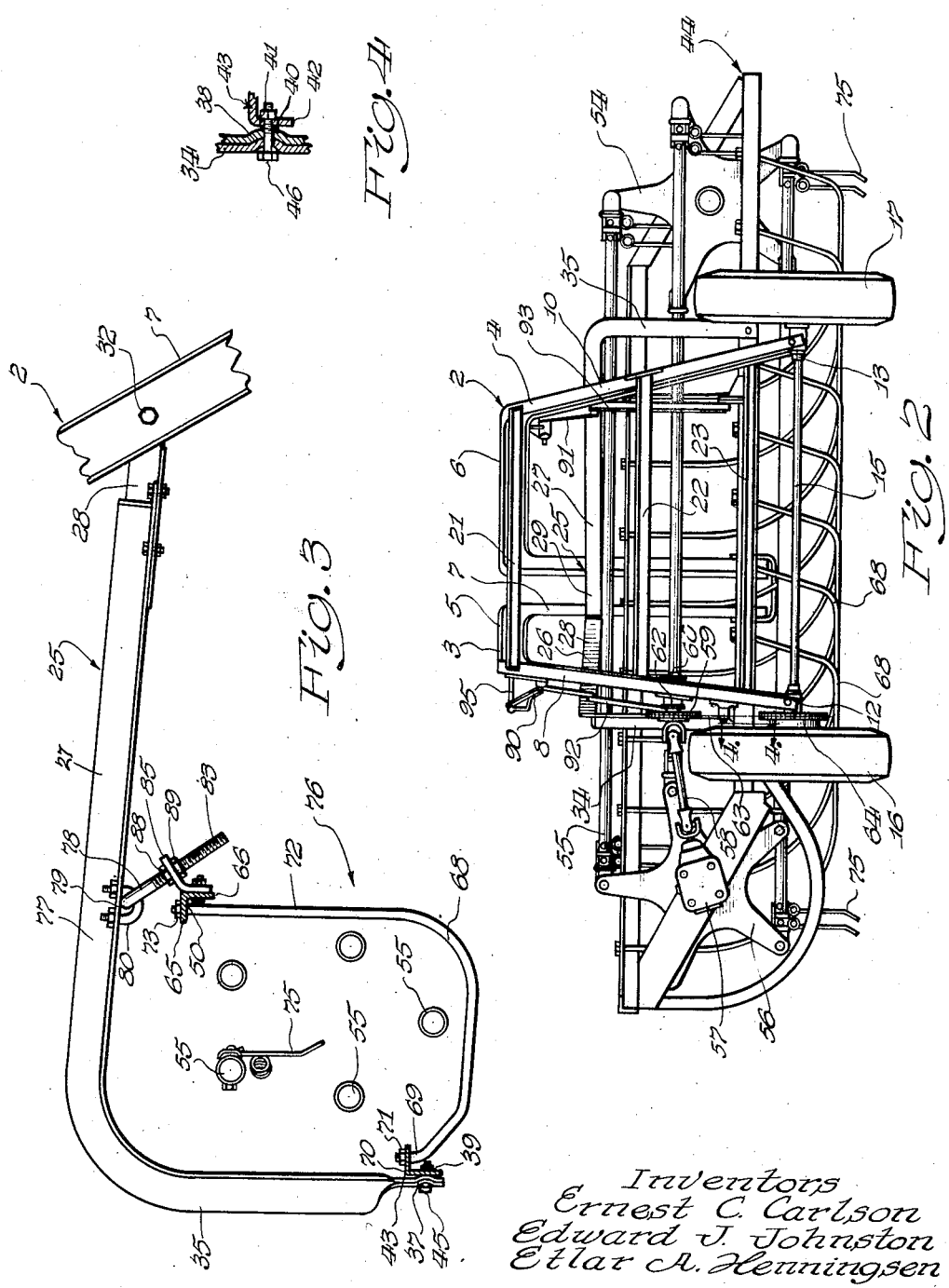

2,861,415

SUSPENSION SYSTEM FOR SIDE DELIVERY RAKE BASKET

Ernest C. Carlson, Wheaton, Edward J. Johnston, Cicero, and Etlar A. Henningsen, Riverside, Ill., assignors to International Harvester Company, Chicago, Ill., a corporation of New Jersey Application February 27, 1957, Serial No. 642,703

6 Claims. (Cl. 56—377)

This invention relates to side delivery rakes and more specifically to a novel system and mechanism for suspending the rake basket and reel in order to conveniently and effectively adjust the pitch or the attitude of the rake teeth with respect to the crops.

In side delivery rakes and particularly those which are commonly known as the parallel bar type it is necessary to provide an adjustment for the reel as well as the basket in order to control the angularity or the raking attitude of the rake teeth with respect to the crops with which the unit is used. This adjustment must be consistent with the supporting structure so that it adds to its structural ruggedness and at the same time obtains an effective range of adjustment without complicated mechanisms.

A more specific object of the invention is to provide a novel mechanism for adjusting the tilt of the reel and basket unit about a relatively short arc and which is simple to operate and easily manipulated in the field by a single individual.

These and other objects of the invention will become more apparent from the specification and the drawings, wherein:

Figure 2 is a rear elevational view of the rake;

Figure 3 is an enlarged sectional view taken essentially on the line 3—3 of Figure 1; and Figure 4 is an enlarged sectional view taken substantially on line 4—4 of Figure 2.

Figure 1:
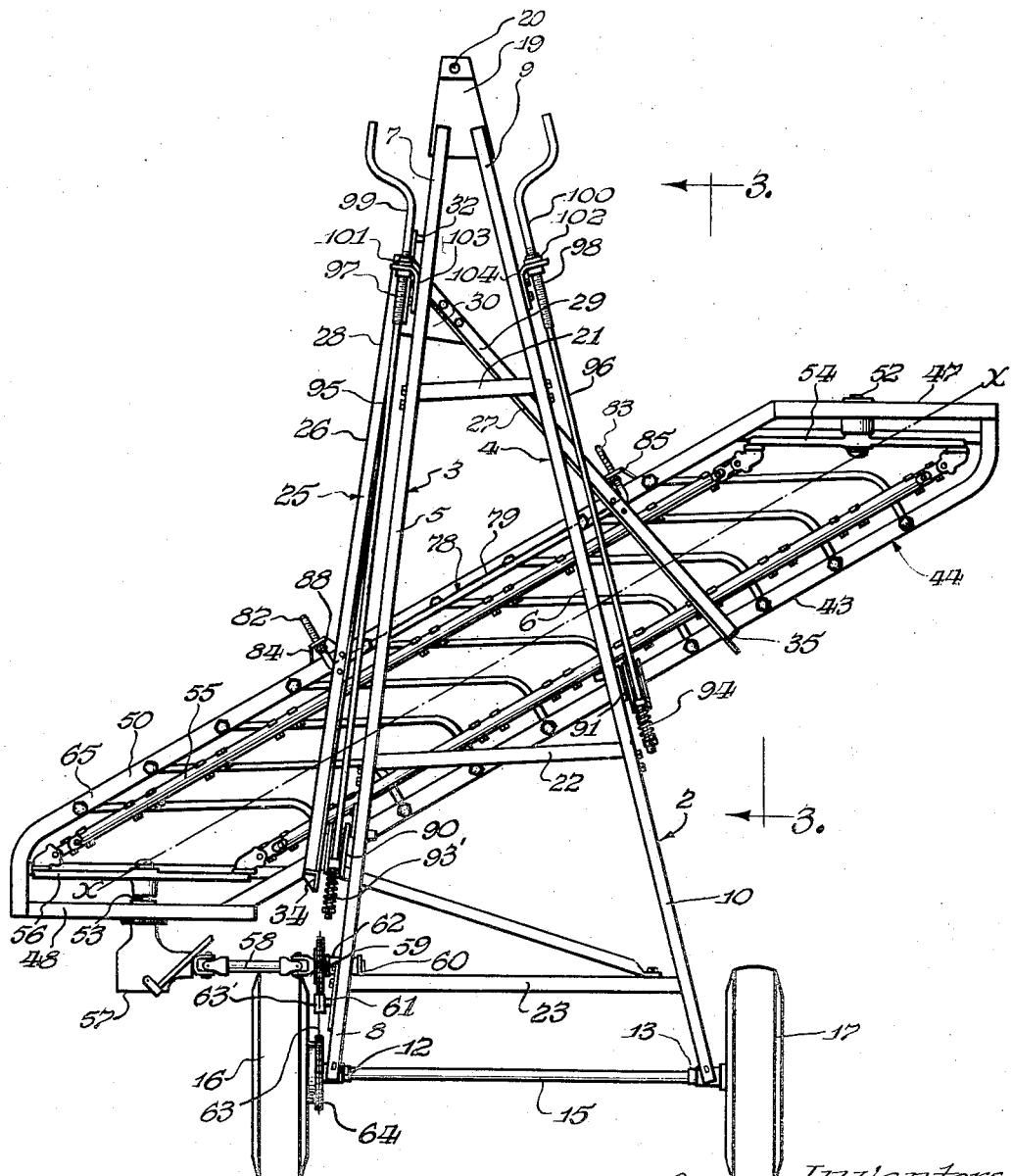
Figure 1 is a plan view of a novel side delivery rake incorporating the invention.

Describing the invention in detail and having particular reference to the drawings there is shown an arched frame generally designated 2 comprising a pair of fore and aft extending channel beam members 3 and 4 which comprise intermediate portions 5 and 6. The member 3 additionally includes front and rear depending legs or portions 7 and 8 and member 4 includes front and rear depending leg or end portions 9 and 10. The lower rear extremities of the rear leg portion 8 and 10 are connected to sleeves or journals 12 and 13 which afford a journal and support for a live axle 15 which outwardly of the members 3 and 4 is connected to ground engaging supporting and drive wheels 16 and 17.

The beam members 3 and 4 converge forwardly and at the lower terminal ends of the forward portions 7 and 9 are connected to a hitch structure 19 which provides a vertical opening 20 for connecting the rake to the drawbar on the associated tractor by means of a pin. The main frame 2 comprises forward intermediate and rear cross braces 21, 22 and 23 which interconnect the members 3 and 4.

There is underposed with respect to the main frame 2 an auxiliary or subsidiary frame or subframe or support generally indicated 25 which is somewhat in the form of a wishbone and which comprises a pair of forwardly converging fore and aft extending angle beam members 26 and 27 and herein shown as L-shaped and the members 26 and 27 have their forward portions 28 and 29 converging into an apex and interconnected by a gusset member 30 forwardly of which is continued the forward or first end of portion 28 designated 28', the portion 28 being pivoted loosely on a bolt 32 which is fixedly connected to the forward leg portion 7 of the main frame member 3 and extending outwardly therefrom. It will be observed that the beam 26 generally parallels the beam 3 transversely of the rake and that the beam 27 intersects the beam member 3 as well as the beam member 4 and extends diagonally thereto. The beam members 26 and 27 have a second end with downwardly extending rear end portions 34 and 35 which at their lower ends 34', 35' are formed to provide forwardly convexed or bowed sections or bearings 37 and 38 respectively which abut respectively at 39 and 40 (Figures 3 and 4) against the flat vertical back side 41 of the depending web 42 of the L-shaped rear beam member 43 of the basket frame work or reel assembly generally designated 44. It will be noted that the portions 37 and 38 are thus pivotally or articulatedly connected by means of bolts 45 and 46 to the basket, the bolts passing through loose openings in the portions 37 and 38 as well seen in Figure 4.

The basket or subframe 44 in addition to the rear transverse member 43 comprises end members 47 and 48 and a front member 50, the members 43, 47, 48 and 50 constituting a somewhat rectangular structure which extends diagonally to the line of travel of the rake. The end members 47 and 48 support spindles 52, 53 on generally parallel fore and aft extending axes, the spindle 52 supporting a spider 54 which through a series of rake bars or tooth bars 55 is connected to the driving spider 56. It will be understood that the spiders and the rake bars are rotationally interconnected as is well known to those skilled in the art. The shaft 53 is driven through a gear box 57 from a jack shaft or flexible shaft 58, the shaft 58 incorporating several universal joints as well seen in Figures 1 and 2 and being driven by a sprocket 59 which is carried on a stub shaft 60 which is supported on a bracket 61 by a journal 62, the bracket 61 being suitably bolted to the leg portion 8 of the main frame. The sprocket 59 is driven by a chain 63 from a sprocket 64 which is connected to the live axle 15 which in turn is driven by the wheels 16 and 17 attendant to and pursuant to forward movement of the rake. The chain is adjusted in tension by a bearing block 63' adjustably mounted on the leg 8. It will be understood, however, that the invention in the present instance is not restricted to a ground driven rake and that it is equally operable and driven from the journal or any other manner as is well known by those skilled in the art and illustrated in the prior patented art.

The forward beam member of the rake basket is an angle or L-beam including a top rearwardly extending web 65 and a downwardly depending web 66. It will be realized from a consideration of Figure 3 that the front and rear members 50 and 43 of the basket support a series of stripper rods or bars 68 therebetween, the bars being spaced lengthwise of the basket and being somewhat J-shaped in side elevation and having their rear ends 69 passing through suitable holes in the forwardly projecting web 70 of the L-shaped rear beam member 43 and being held thereto by means of nuts 71 threaded to upper portions of the rear extremity 69. Similarly the forward portions 72 of the stripper bars have their upper ends threaded and secured to the flange 65 of the forward beam member 50 by nuts 73 threaded on the upper end portions of said legs 72. It will be understood that the threaded portions on which the nuts 71 and 73 are threaded are of reduced cross-sections so that the upper end portions 69 and 72 develop shoulders which abut against the under sides of the flanges 70 and 65 and are drawn up against the respective flanges by means of the related nuts. It will be observed that the stripper bars have a series of fingers 75 positioned at appropriate intervals on the bars 55 so they interdigitate with the stripper bars as they move downwardly from the rear of the basket and ascend on the forward side 76 (Figure 3) of the basket.

The forward side of the basket is connected to an intermediate portion 77 of the wishbone auxiliary structure 25 by means of a bail or U-shaped hanger structure 78 which comprises a rod shaped element having a transverse or a bight portion 79 which is pivotally connected to the intermediate portion 77 of the member 26 and 27 on an axis generally parallel to the longitudinal axis of the basket, the said bight portion 79 passing through a pair of U-shaped or saddle brackets 80 which are connected as well seen in Figure 3 to the horizontal webs of the L-shaped beams 26 and 27 although it will be understood that these beams may be of any desired contour or shape. The bail includes a pair of forwardly and downwardly extending legs 82 and 83 which are disposed outwardly of the mounting members 80 and the legs 82 and 83 extend through brackets 84 and 85 which are connected to the flange 66 of the forward member 50 of the basket as best seen in Figure 3. The legs 82 and 83 are threaded and each pass through suitable enlarged openings in the brackets 84 and 85 and carry upper and lower nuts 88 and 89 which are suitably adjusted by threading or unthreading with respect to the related leg for tilting the basket by raising the forward side or lowering it about the axis of rotation of the basket. It will be understood that if the farmer should want to raise the basket he would loosen the upper units 88 and then tighten up or thread the nuts 89. Conversely if he should want to lower the basket to tilt the basket downwardly he would then loosen the nuts 88 and unthread the nuts 89. After he had placed the basket in the desired position he would then tighten the nuts 88 so as to lock the basket in its adjusted position.

It will be understood that in addition to the tilt adjustment of the basket with respect to the subframe 25 the entire basket is swingable about a point or suspension means 32 by means of a pair of bellcrank assemblies 90 and 91 which are carried by the intermediate portions 5 and 6 of the main frame structure 2, the bellcranks being connected by means of dependent straps or suspension means 92 and 93 to the rear portions of the basket and the other legs of the bellcranks being connected through yieldable or spring-loaded lost motion connections 93', 94 to forwardly extending adjusting units 95 and 96 in the form of threaded rods which cooperate with nut structure 97 and 98 forming part of cranks 99 and 100 which are journalled in suitable bearings 101 and 102 by brackets 103 and 104 which are connected to members 3 and 4 adjacent to the juncture of the intermediate portions 5 and 6 of said members with their forward legs 7 and 9. It will be appreciated that by turning the cranks 99 and 100 in one direction the basket is raised or that the basket may be tilted laterally by cranking on one and unwinding on the other crank, etc., as is well known to those skilled in the art.

What is claimed is:

1. In a side delivery rake comprising a main frame adapted for advance over a field; a subframe below the main frame; means pivotally suspending the subframe from the main frame; and a reel assembly extending transversely of the main frame and subframe below the latter, and said reel assembly including front and rear transverse beam members, the improvement comprising; dependent rear portions on said subframe having lower terminal ends positioned behind said rear member, said rear member and portions presenting opposed articulatingly engaging surfaces, means articulately interconnecting said portions with said rear member, and means operatively interconnecting said front member with said subframe for vertical swinging movement.

2. The combination with a main frame, a subframe wishbone-shaped when viewed from above having a first end pivoted to the main frame, a transverse rake reel and basket assembly with front and rear portions beneath said subframe and including front and rear generally parallel frame members, said subframe including a pair of longitudinal beams converging toward a first end thereof and having a second end with portions spaced laterally and extending generally vertically and terminating in lower ends, means connecting said subframe at said lower ends to one of the frame members for vertical swinging movement about an axis generally parallel to said one frame member, and supporting means operatively and adjustably interconnecting said beams intermediate their ends with the other frame member.

3. The invention according to claim 2 and said connecting means comprising a vertical generally flat surface on said rear member and abutting convex surfaces on said lower ends of said rear portions of said subframe and bolts extending through loose openings in said rear member and respective ends.

4. The invention according to claim 2 and said supporting means comprising a bail having a bight extending transversely of said beams intermediate their ends and pivotally mounted thereon on an axis generally parallel to said front frame member and having threaded legs extending downwardly from opposite ends of the bight, and brackets connected to said front beam member and having openings therein through which respective legs extend, and nuts threaded on said legs above and below respective brackets for locking engagement therewith.

5. In a side delivery rake, an ambulatory main frame having a downwardly extending front portion, an auxiliary frame beneath the main frame having a pair of forwardly converging side beams terminating in an apex, means connecting said auxiliary frame at said apex to said front portion of the main frame, said auxiliary frame having rear portions extending downwardly, a reel assembly beneath the auxiliary frame extending transversely thereto and to the main frame and having front and rear beams extending diagonally to the direction of travel of the rake, said rear portions of the auxiliary frame each having forwardly convexed sections, said rear beam having a flat side seating against said sections, bolts loosely passing through aligned apertures in said sections and rear beam accommodating pivotal movement therebetween, a U-shaped hanger having a bight extending transversely of said side beams of the auxiliary frame and pivotally connected thereto on an axis generally parallel to said front and rear beams of the reel assembly, said hanger having a pair of downwardly and forwardly extending threaded legs at opposite ends of the bight, and brackets on the front beam having apertures receiving respective legs therethrough and nuts threaded on the legs disposed in locking and adjusting relation to said legs.

6. A side delivery rake comprising: a main frame having front and rear ends, and including a pair of side by side beams having at the front end of the frame downwardly extending portions; means connected to said portions for supporting the main frame front end at a fixed height above the ground; means connected to the rear end of the main frame for supporting the same at a fixed height above the ground; a rake basket positioned between the front and rear ends of the main frame and extending transversely with respect to the main frame and including front and rear members; a subframe comprising a support structure having a forward end pivoted to said forward end of the main frame for vertical swinging movement with respect to the main frame and projecting rearwardly over the rake basket; operating means mounted upon the main frame and connected to a portion of the support structure rearwardly of its pivot for moving the support structure upwardly and downwardly; adjusting means adjustably connecting the forward member of the rake basket to the support structure for selected, incremental vertical adjustment of the rake basket with respect to the support structure, and means pivotally connecting said support structure with said rear member on an axis generally parallel to the rear member.

References Cited in the file of this patent

UNITED STATES PATENTS

| | | |
|---|---|---|
| 842,208 | Kirkman | Jan. 29, 1907 |
| 2,708,822 | Sutherland | May 24, 1955 |